(12) United States Patent
Mishima et al.

(10) Patent No.: US 9,378,540 B2
(45) Date of Patent: Jun. 28, 2016

(54) IMAGE PROCESSING DEVICE, IMAGE PROCESSING METHOD, AND IMAGING DEVICE

(71) Applicant: KABUSHIKI KAISHA TOSHIBA, Minato-ku, Tokyo (JP)

(72) Inventors: Nao Mishima, Tokyo (JP); Takeshi Mita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/597,734

(22) Filed: Jan. 15, 2015

(65) Prior Publication Data

US 2015/0221099 A1 Aug. 6, 2015

(30) Foreign Application Priority Data

Feb. 6, 2014 (JP) .................................. 2014-021738

(51) Int. Cl.
*G06K 9/00* (2006.01)
*G06T 3/40* (2006.01)

(52) U.S. Cl.
CPC .................................... *G06T 3/4015* (2013.01)

(58) Field of Classification Search
USPC .............. 382/167, 162, 168, 254; 348/207.1, 348/222.1, 154, 242, 254; 358/1.2, 3.03, 358/3.06, 479
See application file for complete search history.

(56) References Cited

U.S. PATENT DOCUMENTS

| 7,920,752 | B2 * | 4/2011 | Kuno | ........................ G06T 5/20 382/167 |
| 8,452,092 | B2 * | 5/2013 | Sasaki | ................... G06T 3/4015 382/162 |

| 2012/0257821 | A1 | 10/2012 | Saito et al. | ..................... 382/162 |
| 2013/0216130 | A1 | 8/2013 | Saito et al. | ..................... 382/165 |
| 2014/0176760 | A1 | 6/2014 | Taguchi et al. | ............ 348/222.1 |

FOREIGN PATENT DOCUMENTS

| JP | 2007-235311 | 9/2007 | .............. H04N 9/07 |
| JP | 2009-010847 | 1/2009 | .............. H04N 9/07 |
| JP | 2011-091483 | 5/2011 | .............. H04N 9/07 |
| JP | 2011-182354 | 9/2011 | .............. H04N 9/07 |
| JP | 2014-126903 | 7/2014 | ................ G06T 5/20 |

OTHER PUBLICATIONS

H. Malvar et al., "High-Quality Linear Interpolation for Demosaicing of Bayer-Patterned Color Images", IEEE ICASSP2004, vol. 3, pp. 485-488, 2004.

* cited by examiner

*Primary Examiner* — Anh Do
(74) *Attorney, Agent, or Firm* — Nixon & Vanderhye, P.C.

(57) ABSTRACT

According to one embodiment, an image processing device includes a calculator, and an output interface. The calculator acquires image information including a value of a first pixel and values of peripheral pixels disposed around the first pixel. The first pixel is disposed at a first position and has a first color. The calculator calculates a first feature quantity of the value of the first pixel relating to a difference between the value of the first pixel and the values of the peripheral pixels. The calculator calculates a value relating to a second color at the first position by using a first filter coefficient and the values of the peripheral pixels. The first filter coefficient is determined according to the first feature quantity and the first position. The output interface outputs the calculated value relating to the second color at the first position.

20 Claims, 9 Drawing Sheets

$$y_i = c_i^T \left( \sum_j h(-j; i+j) x_{i+j} \right) + \varepsilon_i$$

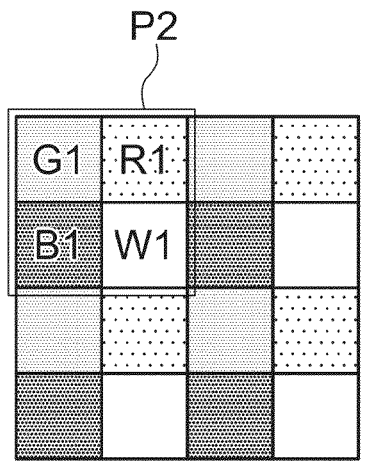 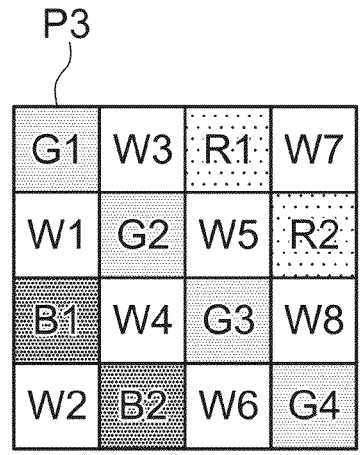
FIG. 6A          FIG. 6B
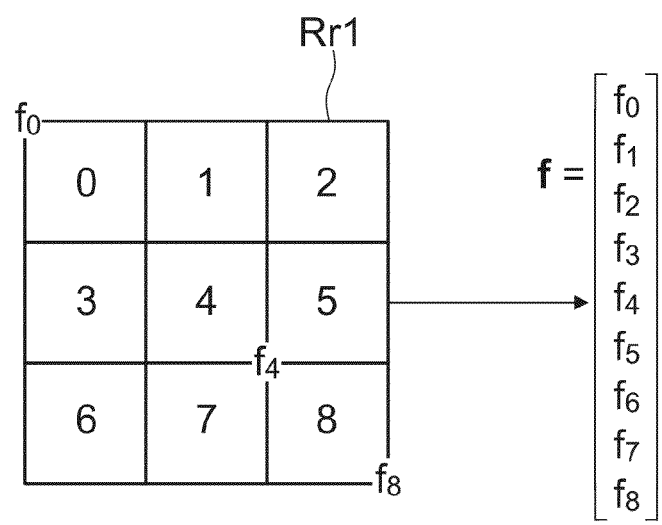
FIG. 7

IMAGE PROCESSING DEVICE, IMAGE PROCESSING METHOD, AND IMAGING DEVICE

CROSS-REFERENCE TO RELATED APPLICATIONS

This application is based upon and claims the benefit of priority from Japanese Patent Application No. 2014-021738, filed on Feb. 6, 2014; the entire contents of which are incorporated herein by reference.

FIELD

Embodiments described herein relate generally to an image processing device, an image processing method, and an imaging device.

BACKGROUND

For example, there is an image processing device that generates a color image from an output image of a single-plate image sensor. It is desirable to increase the image quality of the image in such an image processing device.

BRIEF DESCRIPTION OF THE DRAWINGS

FIG. 6A and FIG. 6B are schematic views illustrating patterns of color arrays;

FIG. 7 is a schematic view illustrating the filter coefficient according to the embodiment;

DETAILED DESCRIPTION

Figure 1:
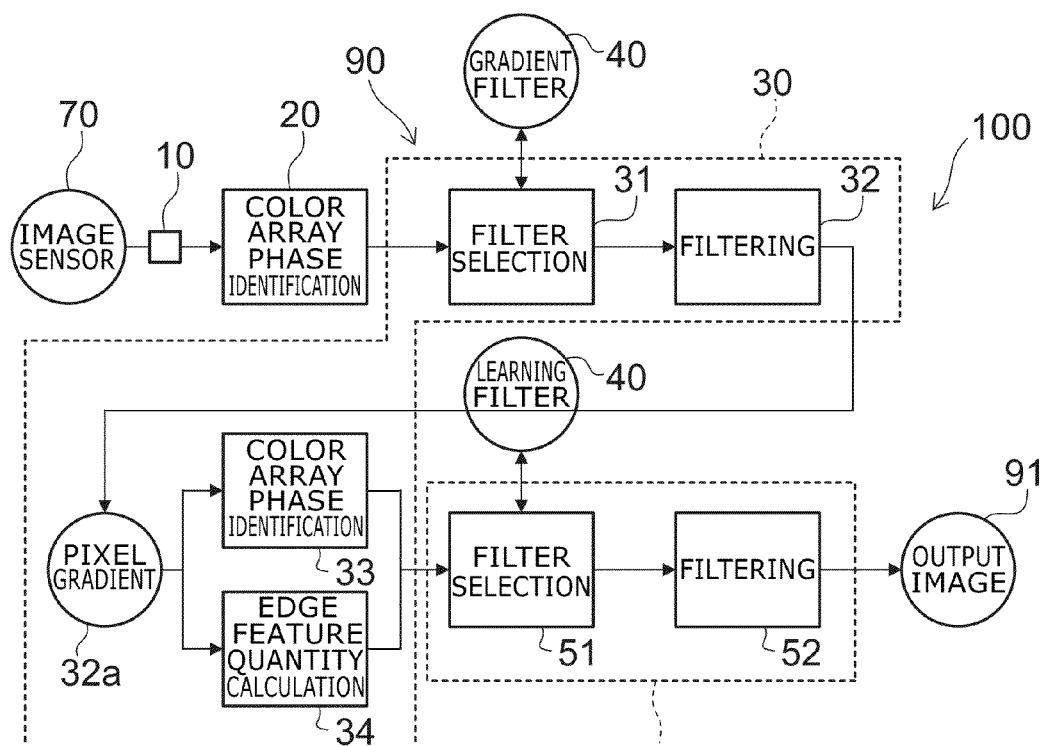
FIG. 1 is a schematic view illustrating a configuration and processing of the image processing device according to the embodiment.

According to one embodiment, an image processing device includes a calculator, and an output interface. The calculator acquires image information including a value of a first pixel and values of each of a plurality of peripheral pixels disposed around the first pixel. The first pixel is disposed at a first position and has a first color. At least one of the peripheral pixels includes a second pixel having a second color. The second color is different from the first color. The calculator calculates, based on the value of the first pixel and a value of at least one of the peripheral pixels, a first feature quantity of the value of the first pixel relating to a difference between the value of the first pixel and the values of each of the peripheral pixels. The calculator calculates a value relating to the second color at the first position by using a first filter coefficient and a value of the second pixel. The first filter coefficient is determined according to the first feature quantity and the first position. The output interface outputs the calculated value relating to the second color at the first position.

According to one embodiment, an image processing method is disclosed. The method includes acquiring image information including a value of a first pixel and values of each of a plurality of peripheral pixels disposed around the first pixel. The first pixel has a first color and is disposed at a first position. At least one of the peripheral pixels includes a second pixel having a second color. The second color is different from the first color. The method includes calculating, based on the value of the first pixel and a value of at least one of the peripheral pixels, a first feature quantity of the value of the first pixel relating to a difference between the value of the first pixel and the values of each of the peripheral pixels. The method includes calculating a value relating to the second color at the first position by using a first filter coefficient and a value of the second pixel. The first filter coefficient is determined according to the first feature quantity and the first position.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

The embodiment provides an image processing device, an image processing method, and an imaging device.

FIG. 1 is a schematic view illustrating a configuration and processing of the image processing device according to the embodiment.

The image processing device 100 includes a calculator 90 and an output unit 91. For example, the calculator 90 includes an input image storage unit 10, a color array identification step 20, a feature quantity calculator 30, a filter storage unit 40, and a filter processor 50. For example, the image processing device 100 is used with an imaging device. Or, the image processing device 100 is built into the imaging device. An imaging element 70 is provided in the imaging device.

For example, an input image (image information) is acquired by the imaging element 70. The imaging element 70 is, for example, a single-plate image sensor. For example, the imaging element 70 includes a CMOS (Complementary Metal Oxide Semiconductor) image sensor, a CCD (Charge Coupled Device) image sensor, etc.

The input image includes data in which multiple pixels are arranged. As described below, each of the pixels has a "value" corresponding to, for example, one color of red, green, blue, or the like. The "value" corresponds to, for example, the brightness (the intensity) of each color. For example, the multiple pixels are arranged in the input image by repeating a unit pattern of a color array described below.

The input image that is acquired by the imaging element 70 is supplied to the input image storage unit 10. The input image storage unit 10 stores the data of the input image. For example, the input image that is stored in the input image storage unit 10 is supplied to the color array identification step 20. The color array identification step 20 identifies which color the value corresponds to for each of the pixels arranged in the input image and outputs the color array information. The color array information includes, for example, information relating to the positions of each of the pixels in the input image and information relating to the color to which the value of each of the pixels corresponds.

For example, a filter coefficient acquisition unit 31, a filter arithmetic unit 32, a color array identification step 33, and an edge feature quantity calculator 34 are provided in the feature quantity calculator 30. Multiple coefficients (multiple filter coefficients) are stored in the filter storage unit 40. The filter coefficients are used when processing the data of the input image. For example, the filter coefficient acquisition unit 31 acquires the filter coefficients stored in the filter storage unit 40 according to the color array information. The filter arithmetic unit 32 performs processing of the data of the input image using the filter coefficients. Thereby, a pixel gradient 32a that is described below is determined. From the pixel gradient 32a that is determined, the color array identification step 33 and the edge feature quantity calculator 34 calculate a "feature quantity" of the data of the input image.

For example, a filter coefficient acquisition unit 51 and a filter arithmetic unit 52 are provided in the filter processor 50. The filter coefficient acquisition unit 51 acquires the filter coefficients stored in the filter storage unit 40 based on a feature of the image calculated by the feature quantity calculator 30. The filter arithmetic unit 52 processes the input image using the filter coefficients that are acquired. Thereby, for example, an output image having higher image quality is obtained. The output image is output from the output unit 91.

In the embodiment, the components recited above that are provided in the calculator 90 are functional components; and the components may be used for more than one function or combined in a single body.

An example of the imaging device that images the input image (the image information) will now be described.

Figure 2:
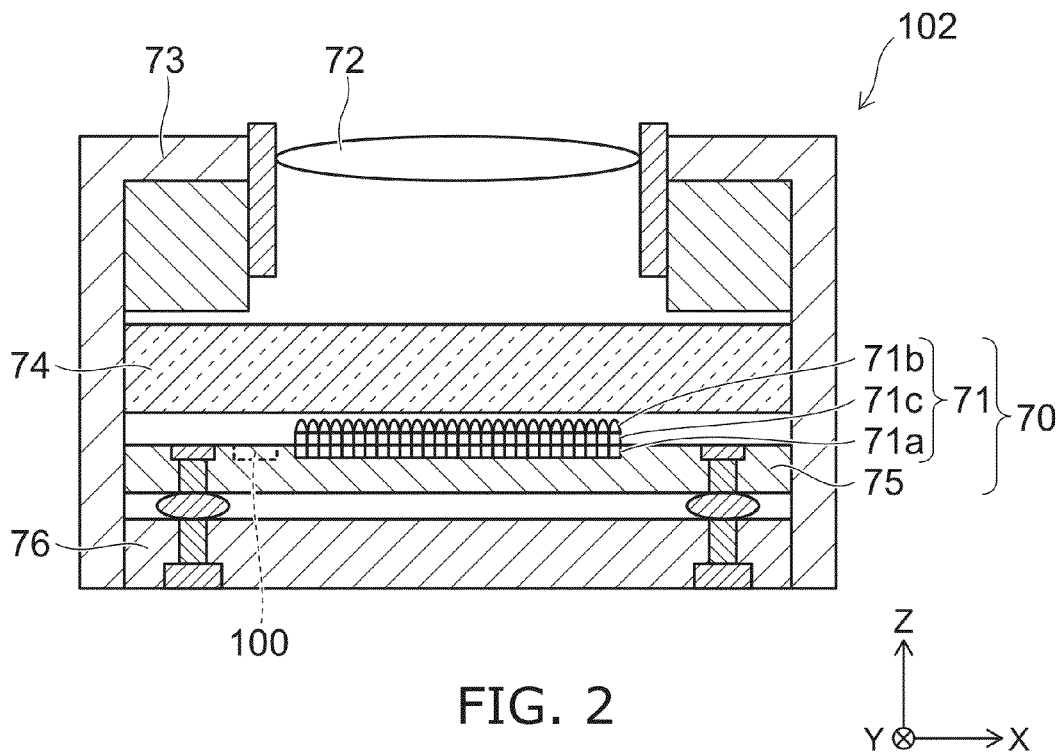
FIG. 2 is a schematic cross-sectional view illustrating the imaging device according to the embodiment.

FIG. 2 is a schematic cross-sectional view illustrating the imaging device according to the embodiment.

As shown in FIG. 2, for example, the imaging element 70, a lens 72, an optical filter unit 74, and a circuit substrate unit 76 are provided in an imaging device 102. The optical filter unit 74 is provided between the circuit substrate unit 76 and the lens 72. The imaging element 70 is provided between the optical filter unit 74 and the circuit substrate unit 76. For example, the lens 72 is held by a lens holder 73.

A direction from the imaging element 70 toward the lens 72 is taken as a Z-axis direction. One direction perpendicular to the Z-axis direction is taken as an X-axis direction. A direction perpendicular to the X-axis direction and perpendicular to the Z-axis direction is taken as a Y-axis direction.

An imaging region 71 and a semiconductor substrate 75 are provided in the imaging element 70. The imaging region 71 is provided between the semiconductor substrate 75 and the optical filter unit 74. For example, the imaging region 71 is disposed at a position overlapping the lens 72 when projected onto the X-Y plane.

In the example, at least a portion of the image processing device 100 is provided in the semiconductor substrate 75. For example, at least a portion of the image processing device 100 is provided to be arranged in the X-axis direction with the imaging region 71.

At least a portion of the image processing device 100 may be provided in a substrate separately from the semiconductor substrate 75. For example, at least a portion of the image processing device 100 may be provided in the circuit substrate unit 76. Further, for example, at least a portion of the image processing device 100 may be provided separately from the imaging device 102.

For example, a photodiode layer 71a, a microlens layer 71b, and a color filter layer 71c are provided in the imaging region 71. The color filter layer 71c is provided between the photodiode layer 71a and the microlens layer 71b.

For example, multiple photodiodes that are arranged in the X-Y plane are provided in the photodiode layer 71a. For example, multiple microlenses that are arranged in the X-Y plane are provided in the microlens layer 71b. For example, multiple color filters that are arranged in the X-Y plane are provided in the color filter layer 71c. Each of the color filters transmits light of a prescribed color. For example, one color filter is provided between one photodiode and one microlens.

The description recited above is an example; and the imaging device, the imaging element, etc., that perform the imaging of the input image in the embodiment are not limited to the imaging device, the imaging element, etc., recited above. Various modifications of the configurations, etc., of the imaging device and the imaging element are possible.

Figure 3:
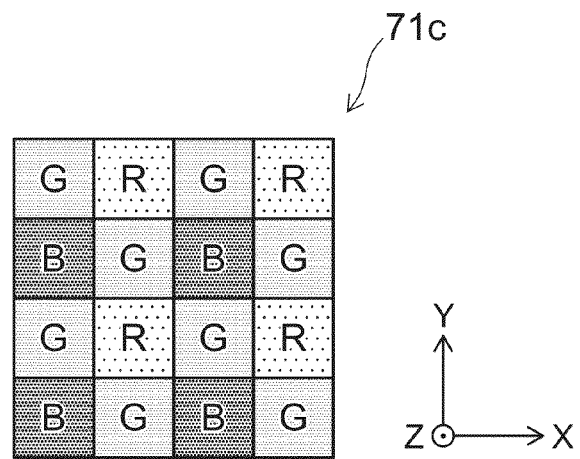
FIG. 3 is a schematic plan view illustrating a color filter used in the imaging device according to the embodiment.

FIG. 3 is a schematic plan view illustrating a color filter used in the imaging device according to the embodiment.

FIG. 3 shows a portion of the color filter layer 71c. In the example, each of the multiple color filters provided in the color filter layer 71c is one of a red filter, a green filter, or a blue filter. For example, the red filter, the green filter, and the blue filter are arranged regularly in the X-Y plane. For example, a unit pattern that includes a blue, red, and green filter is arranged repeatedly in the X-Y plane.

The transmissivity of the red filter to red light is high; and the transmissivity of the red filter to blue and green light is low. The transmissivity of the blue filter to blue light is high; and the transmissivity of the blue filter to red and green light is low. The transmissivity of the green filter to green light is high; and the transmissivity of the green filter to red and blue light is low.

Figure 4:
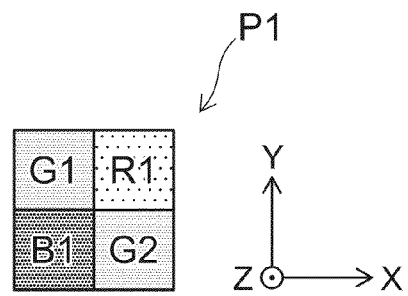
FIG. 4 is a schematic plan view illustrating a pattern of the color array.

FIG. 4 is a schematic plan view illustrating a pattern of the color array.

As shown in FIG. 4, a first blue color B1, a first red color R1, a first green color G1, and a second green color G2 are arranged in a unit pattern P1 of the color array. In the color filter layer 71c shown in FIG. 3, color filters that are arranged according to the unit pattern P1 of the color array are arranged repeatedly. The first red color R1 is disposed at a position contacting the first green color G1. For example, the first blue color B1 is arranged with the first green color G1 in the Y-axis direction. The first red color R1 is arranged with the first green color G1 in the X-axis direction (a direction that intersects (in the example, is perpendicular to) a direction from the first green color G1 toward the first blue color B1). The second green color G2 is arranged with the first red color R1 in the Y-axis direction and arranged with the first blue color B1 in the X-axis direction. The color array shown in FIG. 4 is, for example, a Bayer array.

For example, the lens 72 is disposed between the imaging element 70 and the subject (not shown). For example, at least a portion of the light that travels from the subject toward the imaging device 102 is incident on the lens 72. At least a portion of the light that is incident is refracted by the lens 72, passes through the optical filter unit 74, and is incident on the imaging region 71 of the imaging element 70. At least a portion of the light that is incident on the imaging region 71 passes through the microlenses and the color filter and is incident on the photodiodes. Charge is produced in the photodiodes according to the intensity of the light. For example, the intensity (the value) of the light that is incident on the photodiodes is detected by detecting the charge.

The value that corresponds to the intensity of the light is determined for each of the photodiodes arranged in the X-Y plane. For example, the value that is detected for one photodiode is the value of one pixel. Thus, for example, the distribution of the intensity of the light that is incident on the imaging region 71 in the X-Y plane is detected. Thereby, the input image is obtained.

In the input image, each of the pixels has a value corresponding to the light of one color of red, green, or blue.

In the input image, a pixel that has the value corresponding to red light, a pixel that has the value corresponding to blue light, and the pixel that has the value corresponding to green light are arranged according to a pattern in which the unit pattern P1 is arranged repeatedly.

The image information of the input image includes, for example, the value of a first pixel having a first color, the value of a second pixel having a second color, the value of a third pixel having a third color, and the value of a fourth pixel having a fourth color. For example, the first color, the second color, and the third color are different from each other. Each of the first color, the second color, and the third color is one color of red, green, or blue. For example, the first color is the first green color G1; the second color is the first blue color B1; and the third color is the first red color R1. For example, the fourth color is the second green color G2. The first pixel is arranged with the second pixel in a first direction. The third pixel is arranged with the first pixel in a second direction that intersects the first direction. The fourth pixel is arranged with the second pixel in the second direction and arranged with the third pixel in the first direction.

Figure 5:
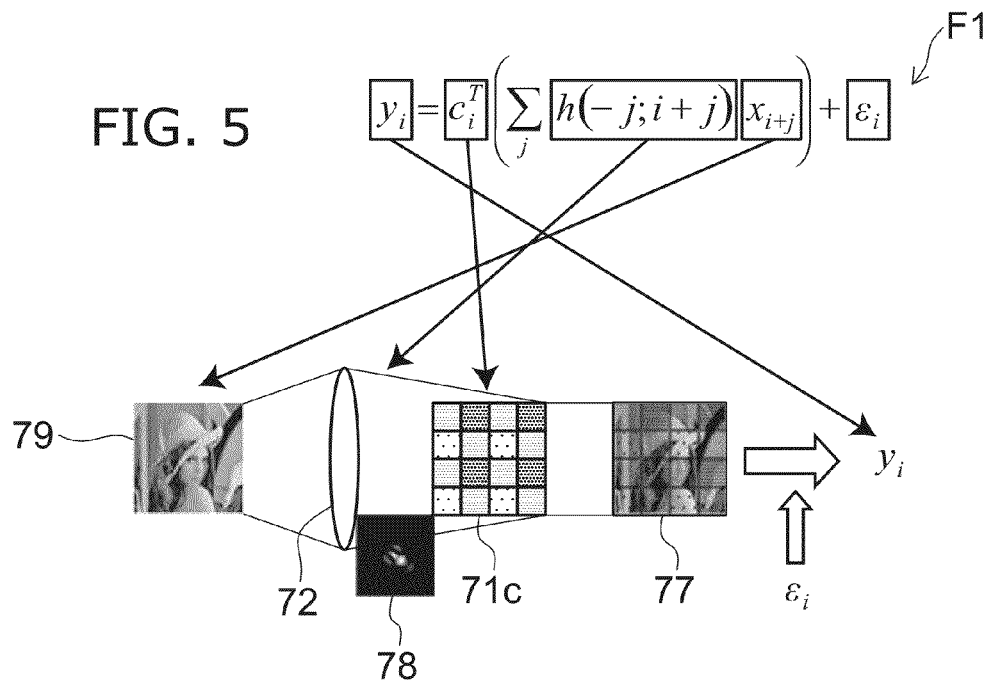
FIG. 5 is a schematic view illustrating the input image.

FIG. 5 is a schematic view illustrating the input image.

The input image is expressed by, for example, the model of Formula F1. $y_i$ corresponds to the value of the pixel. In other words, $y_i$ is, for example, the value of the pixel at a position i inside the input image. The value that corresponds to the position (i+j) inside the input image and corresponds to the light traveling in the direction from a subject 79 toward the lens 72 is $X_{i+j}$. The light passes through the lens 72 and is incident on the color filter layer 71c. At this time, there are cases where blurring 78 of the light occurs. The blurring 78 is expressed by, for example, the point spread function (PSF) $h(-j; i+j)$. The light that is incident on the color filter layer 71c and has the color corresponding to the color of the color filter is incident on the photodiode; and a value 77 of the image is obtained. $C_i$ is the color of the color filter at the position i. $\epsilon_i$ is the noise at the position i.

In the image imaging element, for example, a value that corresponds to one color of red, green, or blue is obtained from one pixel of the input image. In the example, for example, the number of pixels that have the value corresponding to red light is about ¼ of the number of all of the pixels included in the input image. The amount of information of the input image is reduced by providing the color filters. Therefore, the image quality of the input image is not sufficiently high.

The image quality can be increased by obtaining the data of the values corresponding to red, green, and blue for each of the pixels. For example, the image quality is increased by processing the input image. For example, for each of the pixels, the value that corresponds to the light of the colors that do not correspond to the pixel are determined from the values of the surrounding pixels. For example, the value of green is determined for a pixel (a red pixel) having the value of red by using the value of a pixel (a surrounding green pixel) that is positioned around the red pixel and has the value of green. In other words, demosaicing (e.g., interpolating) is performed.

In the embodiment, the color filters that are used in the color filter layer 71c are not limited to red, green, and blue filters. For example, a color filter (a white filter) or a gray color filter that is transmissive to red, green, and blue light may be used. Further, the colors of YMC may be used.

In the embodiment, the unit pattern of the color array is not limited to the Bayer array shown in FIG. 4.

FIG. 6A and FIG. 6B are schematic views illustrating patterns of color arrays.

As shown in FIG. 6A, the first blue color B1, the first red color R1, the first green color G1, and a first white color W1 (a neutral color) are arranged in a unit pattern P2. In the unit pattern P2, the second green color G2 of the unit pattern P1 is replaced with the first white color W1.

In the case where the unit pattern P2 is used as the array of the color filter, the pixels having the values corresponding to each color are arranged in the input image according to a pattern in which the unit pattern P2 is arranged repeatedly.

Namely, in such a case, the image information of the input image includes the value of the first pixel having the first color, the value of the second pixel having the second color, the value of the third pixel having the third color, and the value of the fourth pixel having the fourth color. For example, the first color, the second color, the third color, and the fourth color are different from each other. Each of the first color, the second color, the third color, and the fourth color is one color of red, green, blue, or white. For example, the first color is the first green color G1; the second color is the first blue color B1; the third color is the first red color; and the fourth color is the first white color W1. The first pixel is arranged with the second pixel in the first direction. The third pixel is arranged with the first pixel in the second direction intersecting the first direction. The fourth pixel is arranged with the second pixel in the second direction and arranged with the third pixel in the first direction.

The first blue color B1, a second blue color B2, the first red color R1, a second red color R2, the first to fourth green colors G1 to G4, and the first to eighth white colors W1 to W8 are arranged in a unit pattern P3 shown in FIG. 6B. Four rows and four columns of color filters are arranged in the unit pattern P3. For example, in the first column, the first green color G1, a second white color W2, the first white color W1 that is disposed between the first green color G1 and the second white color W2, and the first blue color B1 that is disposed between the first white color W1 and the second white color W2 are provided.

A seventh white color W7 is separated from the first green color G1 in a direction that intersects (e.g., is perpendicular to) the direction from the first green color G1 toward the second white color W2. A third white color W3 is disposed between the first green color G1 and the seventh white color W7; and the first red color R1 is disposed between the third white color W3 and the seventh white color W7.

The second red color R2 is separated from the first white color W1 in the first direction. The second green color G2 is disposed between the first white color W1 and the second red color R2; and a fifth white color W5 is disposed between the second green color G2 and the second red color R2.

The eighth white color W8 is separated from the first blue color B1 in the first direction. A fourth white color W4 is disposed between the first blue color B1 and the eighth white color W8; and a third green color G3 is disposed between the fourth white color W4 and the eighth white color W8.

The fourth green color G4 is separated from the second white color W2 in the first direction. The second blue color B2 is disposed between the second white color W2 and the fourth green color G4; and a sixth white color W6 is disposed between the second blue color B2 and the fourth green color G4.

In the case where the unit pattern P3 is used in the array of the color filters, the pixels having the values corresponding to each color are arranged in the input image according to a pattern in which the unit pattern P3 is arranged repeatedly.

Other than the unit pattern P1, a color array such as the unit pattern P2 or the unit pattern P3 may be used in the embodiment. For example, color arrays in which the unit patterns described above are modified may be used.

The demosaicing is performed by the filter processor 50 by processing that uses the values of the input image and the filter coefficients stored in the filter storage unit 40. The processing includes, for example, processing (convolution) of multiplying the values by the filter coefficients.

In the specification, the input image in which the demosaicing described above is not performed is called a raw image. The image for which demosaicing of the input image is performed and the pixels have values corresponding to the light of multiple colors (e.g., red, green, and blue) is called a full color image.

An example of a method for demosaicing according to the embodiment will now be described. First, an example of the filter processing will be described.

For example, one direction inside the image is taken as an x-axis direction. A direction inside the image that is perpendicular to the x-axis direction is taken as a y-axis direction. For example, in the image, the coordinates of a pixel at the position having an x-coordinate of i and a y-coordinate of j are (i, j).

For example, a correct image is prepared in which the same subject is imaged by a method that is different from the imaging of the raw image. For example, in the raw image, each pixel has only the value of one color of red, green, or blue. On the other hand, in the correct image, each pixel has the values of red, green, and blue.

Because each pixel has the values corresponding to each color in the correct image, the image quality of the correct image is higher than the image quality of the raw image. For example, the correct image is obtained by a three-plate image sensor.

The values of the pixel that is positioned at the coordinates (i, j) inside the correct image are, for example, $x_c(i, j)$. "c" is the label that indicates the color of the light. For example, the value that corresponds to green light of the pixel positioned at the coordinates (i, j) is $x_G(i, j)$. Similarly, the values that correspond to red and blue light of the pixel positioned at the coordinates (i, j) are $x_R(i, j)$ and $x_B(i, j)$, respectively.

In the raw image, the colors that correspond to the values of the pixel positioned at the coordinates (i, j) are c(i, j). c(i, j) is determined by the color array of the color filters. The value $y_{RAW}(i, j)$ of the pixel positioned at the coordinates (i, j) inside the raw image is $y_{RAW}(i, j) = x_{c(i, j)}(i, j)$.

For example, filter processing of the values of the pixel positioned at the coordinates (i, j) is implemented for the raw image. At this time, for example, the values of the pixels for which the distance from the coordinates (i, j) is r or less are used. In the raw image, the values of the pixels for which the distance from the coordinates (i, j) is r or less is expressed by $$y_{RAW}(i, j) = \begin{bmatrix} y_{RAW}(i-r, j-r) \\ \vdots \\ y_{RAW}(i+r, j+r) \end{bmatrix}. \quad \text{[Formula 1]}$$

FIG. 7 is a schematic view illustrating the filter coefficient according to the embodiment.

The filter coefficient f is treated as a vector. For example, the filter coefficient (the linear filter) that corresponds to a region inside the image having a radius r is expressed by $$f = \begin{bmatrix} f_0 \\ \vdots \\ f_{(2r+1)(2r+1)-1} \end{bmatrix}. \quad \text{[Formula 2]}$$

The vector is treated as being sorted so that the order of the arrangement of the filter table is the lexicographical order shown in FIG. 7. Thereby, for example, the mathematical treatment is easy.

The filter processing of the demosaicing is performed by the inner product of the image data and the filter coefficient as in $$y_{RAW}(i,j)^T f \quad \text{[Formula 3]}.$$

Here, "T" refers to the transpose.

For example, the filter coefficient is determined appropriately. Thereby, the image quality after the filter processing increases. For example, the filter coefficient hereinbelow is determined so that the difference between the correct image and the image after the filter processing is a minimum.

$$\hat{f} \quad \text{[Formula 4]}$$

Hereinbelow, the filter coefficient recited above is called "f-hat".

The filter coefficient f-hat is, for example, the solution of $$\hat{f} = \underset{f}{\operatorname{argmin}} \sum_{(i,j)^T \in N} (y_{RAW}(i, j)^T f - x_c(i, j))^2. \quad \text{[Formula 5]}$$

Here, $$\underset{f}{\operatorname{argmin}} E \quad \text{[Formula 6]}$$

represents the vector f being determined so that E is a minimum. The set N is the set of the coordinates of the positions of the image. The filter coefficient f-hat is treated as a vector.

In the learning of the filter coefficient, for example, the filter coefficient is determined so that the difference between the correct image and the image after the filter processing is a minimum.

An example of a method for demosaicing using the filter processing will now be described.

Figure 8:
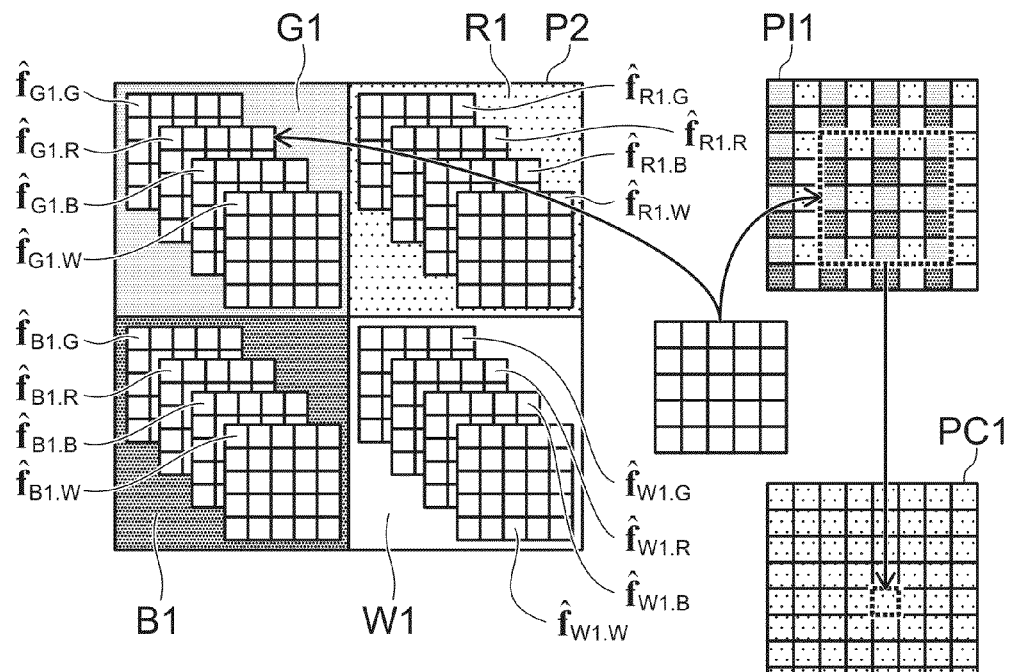
FIG. 8 is a schematic view illustrating the filter coefficient according to the embodiment.

FIG. 8 is a schematic view illustrating the filter coefficient according to the embodiment.

In the input image in the example, the values are arranged using the unit pattern P2.

When performing the demosaicing as shown in FIG. 8, a filter coefficient that corresponds to the "positions of each of the pixels" and "each of the colors" is prepared. The "positions of each of the pixels" are the positions of the pixels inside the unit pattern of the color array. "Each of the colors" refers to the colors corresponding to the values obtained by the processing (e.g., the interpolation) by the demosaicing.

For example, in the case where demosaicing is performed for the pixel disposed at the position of the first green color G1, the green interpolation filter coefficient f-hat$_{G1,G}$ at the position of the first green color G1, the red interpolation filter coefficient f-hat$_{G1,R}$ at the position of the first green color G1, the blue interpolation filter coefficient f-hat$_{G1,B}$ at the position of the first green color G1, and the white interpolation filter coefficient f-hat$_{G1,W}$ at the position of the first green color G1 are prepared.

Similarly, for example, in the case where demosaicing is performed for the pixel disposed at the position of the first blue color B1, the green interpolation filter coefficient f-hat$_{B1,G}$ at the position of the first blue color B1, the red interpolation filter coefficient f-hat$_{B1,R}$, the blue interpolation filter coefficient f-hat$_{B1,B}$, and the white interpolation filter coefficient f-hat$_{B1,W}$ are prepared.

Similarly, for example, in the case where demosaicing is performed for the pixel disposed at the position of the first red color R1, the green interpolation filter coefficient f-hat$_{R1,G}$ at the position of the first red color R1, the red interpolation filter coefficient f-hat$_{R1,R}$, the blue interpolation filter coefficient f-hat$_{R1,B}$, and the white interpolation filter coefficient f-hat$_{R1,W}$ are prepared.

Similarly, for example, in the case where demosaicing is performed for the pixel disposed at the position of the first white color W1, the red interpolation filter coefficient f-hat$_{W1,R}$ at the position of the first white color W1, the green interpolation filter coefficient f-hat$_{W1,G}$, the blue interpolation filter coefficient f-hat$_{W1,B}$, and the white interpolation filter coefficient f-hat$_{W1,W}$ are prepared.

The filter coefficients are determined so that the difference between a correct image PC1 and the image after the filter processing of an input image PI1 is small.

Here, a set U is the set of the coordinates (the positions) u of each pixel inside the unit pattern of the color array. The position u is treated as, for example, a vector. In the case of the unit pattern P1 (the Bayer array), this is expressed by $$U = \left\{ \begin{bmatrix} 0 \\ 0 \end{bmatrix}, \begin{bmatrix} 1 \\ 0 \end{bmatrix}, \begin{bmatrix} 0 \\ 1 \end{bmatrix}, \begin{bmatrix} 1 \\ 1 \end{bmatrix} \right\}. \qquad \text{[Formula 7]}$$

In the case of the unit pattern P3, this is expressed by $$U = \left\{ \begin{bmatrix} 0 \\ 0 \end{bmatrix}, \begin{bmatrix} 1 \\ 0 \end{bmatrix}, \begin{bmatrix} 2 \\ 0 \end{bmatrix}, \begin{bmatrix} 3 \\ 0 \end{bmatrix}, \begin{bmatrix} 0 \\ 1 \end{bmatrix}, \begin{bmatrix} 1 \\ 1 \end{bmatrix}, \begin{bmatrix} 2 \\ 1 \end{bmatrix}, \begin{bmatrix} 3 \\ 1 \end{bmatrix}, \right. \qquad \text{[Formula 8]}$$
$$\left. \begin{bmatrix} 0 \\ 2 \end{bmatrix}, \begin{bmatrix} 1 \\ 2 \end{bmatrix}, \begin{bmatrix} 2 \\ 2 \end{bmatrix}, \begin{bmatrix} 3 \\ 2 \end{bmatrix}, \begin{bmatrix} 0 \\ 3 \end{bmatrix}, \begin{bmatrix} 1 \\ 3 \end{bmatrix}, \begin{bmatrix} 2 \\ 3 \end{bmatrix}, \begin{bmatrix} 3 \\ 3 \end{bmatrix} \right\}.$$

A set C is the set of the colors c of the color filters used in the unit pattern. For example, the set C={R, G, B, W} in the case where the unit pattern P2 is used.

The filter coefficient used in the demosaicing is expressed by, for example, $$f_{u,c} \forall u \in U, c \in C \qquad \text{[Formula 9]}.$$

All of the components inside the set U and all of the components inside the set C are expressed by $$\forall u \in U, c \in C \qquad \text{[Formula 10]}.$$

The filter coefficient of the learning is, for example, the solution of $$\hat{f}_{u,c} = \underset{f}{\operatorname{argmin}} \sum_{(i,j)^T \in N_u} (y_{RAW}(i, j)^T f - x_c(i, j))^2, \qquad \text{[Formula 11]}$$

$$\forall u \in U, c \in C.$$

The set $N_u$ is the set of the coordinates of the pixels where the position inside the unit pattern is the position u. In other words, the values of the pixels having the same position inside the unit pattern are used.

The solution of the formula recited above is determined from the optimal requirements of $$\hat{f}_{u,c} = \left\{ \sum_{(i,j)^T \in N_u} y_{RAW}(i, j)(y_{RAW}(i, j)^T) \right\}^{-1} \qquad \text{[Formula 12]}$$

$$\sum_{(i,j)^T \in N_u} y_{RAW}(i, j) x_c(i, j),$$

$$\forall u \in U, c \in C.$$

to give $$\frac{\partial E}{\partial f} = \sum_{(i,j)^T \in N_u} y_{RAW}(i, j)(y_{RAW}(i, j)^T \hat{f}_{u,c} - x_c(i, j)) = 0 \qquad \text{[Formula 13]}$$

$$\left\{ \sum_{(i,j)^T \in N_u} y_{RAW}(i, j)(y_{RAW}(i, j)^T) \right\} \hat{f}_{u,c} -$$

$$\sum_{(i,j)^T \in N_u} y_{RAW}(i, j) x_c(i, j) = 0.$$

In the image processing device according to the embodiment, the filter coefficient is prepared for each feature of the data of the input image. The feature of the image is determined from, for example, the gradient (the pixel gradient 32a) of the values of the pixels inside the image. The gradient is, for example, the difference between the value of one pixel and the values of other pixels around the one pixel. The difference also includes the information of the distances between the one pixel and the other pixels.

Figure 9:
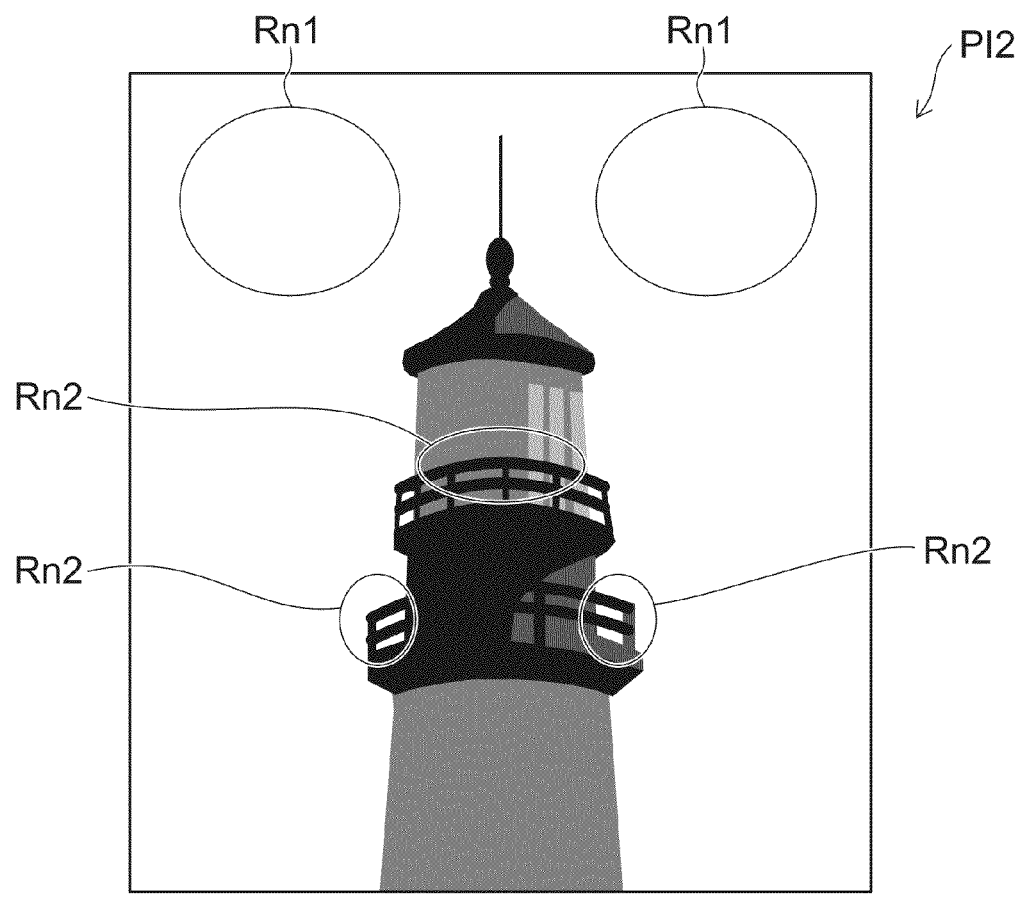
FIG. 9 is a schematic view illustrating an input image according to the embodiment.

FIG. 9 is a schematic view illustrating an input image according to the embodiment.

The input image PI2 shown in FIG. 9 includes a first region Rn1 and a second region Rn2. The first region Rn1 is a region inside the image where the gradient of the values of the pixels is small. The second region Rn2 is a region inside the image where the gradient of the values of the pixels is large. For example, the filter coefficient that is used in the demosaicing of the pixels inside the first region Rn1 is different from the filter coefficient that is used in the demosaicing of the pixels inside the second region Rn2.

For example, the filter coefficient that is used in the demosaicing of the pixels inside the second region Rn2 is determined by the gradient of the values of the pixels inside the image. For example, the feature of the image is classified into multiple classes based on the gradient. The demosaicing is performed using different filter coefficients for each class. For example, the filter coefficient that is used in the demosaicing of the pixels inside the second region Rn2 is determined by learning.

For example, the gradient of the values inside the image may be expressed as a rotation angle θ, an elongation ρ, and a scale γ described below. The filter coefficient that is used in the demosaicing according to the embodiment may be expressed by, for example, $$\hat{f}_{u,c}^{m,n,o} \forall u \in U, c \in C$$

$$m=\theta, n=\rho, o=\gamma. \quad \text{[Formula 14]}$$

In other words, the filter coefficient $\hat{f}_{u,c}^{m,n,o}$ that is used in the demosaicing according to the embodiment is prepared for each position of each pixel inside the unit pattern, each color corresponding to the value to be interpolated, and each feature of the image.

An example of the filter coefficient determined for each feature of the image will now be described using the pixel gradient as the feature of the image. For example, filter processing of the input image is performed. Thereby, for example, the gradient of the signals inside the image can be determined. The filter coefficient for the gradient calculation may be determined by, for example, learning.

The filter coefficient for the gradient calculation in the x-direction and the filter coefficient for the gradient calculation in the y-direction are prepared for each position of each pixel inside the unit pattern of the color array.

For example, the gradient in the x-direction of the coordinates (i, j) is $d_x(i, j)$. The gradient in the y-direction of the coordinates (i, j) is $d_y(i, j)$. For example, there are edges inside the image. For example, the absolute value of $d_x(i, j)$ or $d_y(i, j)$ is large at the edges.

The filter coefficient for the gradient calculation is the solution of $$\hat{f}_{u,d_x} = \underset{f}{\operatorname{argmin}} \sum_{(i,j)^T \in N_u} (y_{RAW}(i, j)^T f - d_x(i, j))^2, \quad \text{[Formula 15]}$$

$$\forall u \in U \text{ and}$$

$$\hat{f}_{u,d_y} = \underset{f}{\operatorname{argmin}} \sum_{(i,j)^T \in N_u} (y_{RAW}(i, j)^T f - d_y(i, j))^2, \quad \text{[Formula 16]}$$

$$\forall u \in U.$$

For example, the filter coefficient $\hat{f}_{u,d_x}$ for the gradient calculation that calculates the gradient in the x-direction of the values of the image is expressed by $$\hat{f}_{u,d_x} = \left\{ \sum_{(i,j)^T \in N_u} y_{RAW}(i, j)(y_{RAW}(i, j)^T) \right\}^{-1} \quad \text{[Formula 17]}$$

$$\sum_{(i,j)^T \in N_u} y_{RAW}(i, j) d_x(i, j), \quad \forall u \in U.$$

Similarly, the filter coefficient $\hat{f}_{u,d_y}$ for the gradient calculation that calculates the gradient in the y-direction of the values of the image is expressed by $$\hat{f}_{u,d_y} = \left\{ \sum_{(i,j)^T \in N_u} y_{RAW}(i, j)(y_{RAW}(i, j)^T) \right\}^{-1} \quad \text{[Formula 18]}$$

$$\sum_{(i,j)^T \in N_u} y_{RAW}(i, j) d_y(i, j), \quad \forall u \in U.$$

Figure 10:
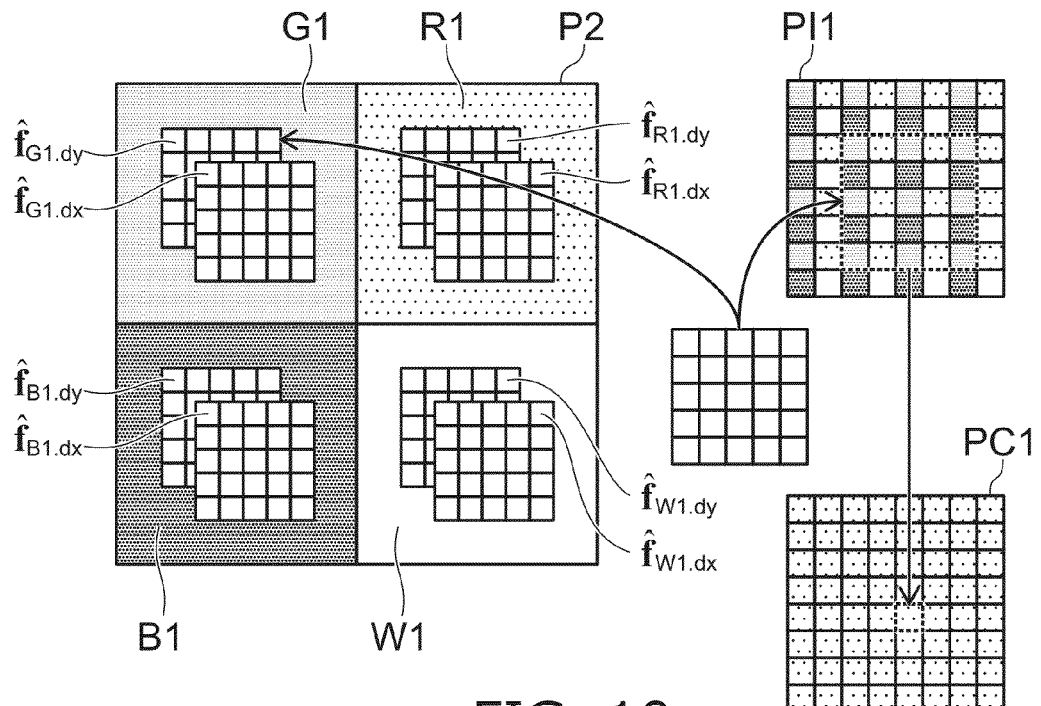
FIG. 10 is a schematic view illustrating a filter coefficient according to the embodiment.

FIG. 10 is a schematic view illustrating a filter coefficient according to the embodiment.

In the case where the gradient of the values of the image is calculated as shown in FIG. 10, the filter coefficient is prepared for each position of each pixel inside the unit pattern of the color array.

For example, the gradient calculation filter coefficient $\hat{f}_{G1,dX}$ in the x-direction at the position of the first green color G1 and the gradient calculation filter coefficient $\hat{f}_{G1,dy}$ in the y-direction at the position of the first green color G1 are prepared.

Similarly, the gradient calculation filter coefficient $\hat{f}_{B1,dX}$ in the x-direction and the gradient calculation filter coefficient $\hat{f}_{B1,dy}$ in the y-direction are prepared for the pixel disposed at the position of the first blue color B1.

The gradient calculation filter coefficient $\hat{f}_{R1,dX}$ in the x-direction and the filter coefficient $\hat{f}_{R1,dy}$ for the gradient calculation in the y-direction are prepared for the pixel disposed at the position of the first red color R1.

The gradient calculation filter coefficient $\hat{f}_{W1,dx}$ in the x-direction and the filter coefficient $\hat{f}_{W1,dy}$ for the gradient calculation in the y-direction are prepared for the pixel disposed at the position of the first white color W1.

Filter processing of the input image PI1 is performed; and the gradient of the values of the image is calculated. The filter coefficient for the gradient calculation is determined so that the difference between the gradient that is calculated and the gradient of the correct image PC1 is small.

For example, the feature of the image is calculated based on the gradient that is calculated by the filter processing. For example, the parameter of a rotating kernel k that represents the direction and size of the gradient is calculated.

The rotating kernel k is expressed by, for example, an anisotropic Gaussian distribution based on the direction of the gradient and the size of the gradient. The rotating kernel is defined by $$k(i, j, s) = \exp\left(-\frac{1}{h^2} s^T H(i, j) s\right) \quad \text{[Formula 19]}$$

$$H(i, j) = \begin{bmatrix} d_x(i, j)^2 & d_x(i, j) d_y(i, j) \\ d_x(i, j) d_y(i, j) & d_y(i, j)^2 \end{bmatrix}$$

using the structure tensor H(i, j) of the differential.

The position s is the position (the vector) of the points inside a region N. The region N is a region at the local vicinity centered on the position of the coordinates (i, j). The region N may have any configuration. For example, a five-by-five tap rectangular region centered on the position (i, j) may be used as the region N. h (global smooth) is the standard deviation of the anisotropic Gaussian distribution, where h>0.

Figure 11:
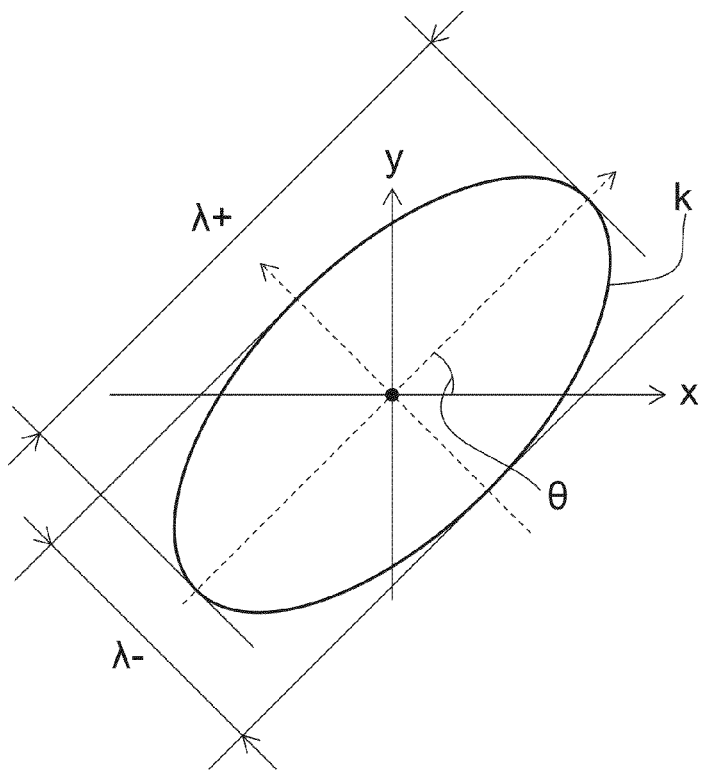
FIG. 11 is a schematic view illustrating the rotating kernel according to the embodiment.

FIG. 11 is a schematic view illustrating the rotating kernel according to the embodiment.

FIG. 11 shows the rotating kernel k(i, j, s) at the position s centered on the coordinates (i, j).

As shown in FIG. 11, the configuration of the rotating kernel k is, for example, an ellipse. A major axis length $\lambda_+$ is the major-axis direction length of the ellipse. A minor axis length $\lambda_-$ is the minor-axis direction length of the ellipse. The x-coordinate is the position of the pixel; and the rotation angle θ is the angle to the major-axis direction of the ellipse.

For example, the major axis length $\lambda_+$, the minor axis length $\lambda_-$, and the rotation angle θ are used as the parameters of the rotating kernel k. $\lambda_+$, $\lambda_-$, and the rotation angle θ are expressed by $$\lambda_x = \frac{C_{xx} + C_{yy}}{2} \pm \sqrt{\frac{(C_{xx} - C_{yy})^2}{4} + C_{xy}^2} \quad \text{[Formula 20]}$$

$$\theta(i, j) = \begin{cases} \frac{\pi}{4} & \text{if } (C_{xx} = C_{yy}) \cap (C_{xy} > 0) \\ -\frac{\pi}{4} & \text{if } (C_{xx} = C_{yy}) \cap (C_{xy} < 0) \\ 0 & \text{if } C_{xx} = C_{yy} = C_{xy} = 0 \\ \frac{1}{2}\tan^{-1}\left(\frac{2C_{xy}}{C_{xx} - C_{yy}}\right) & \text{otherwise} \end{cases}$$

Here, this is $$H(i, j) = \begin{bmatrix} d_x(i, j)^2 & d_x(i, j)d_y(i, j) \\ d_x(i, j)d_y(i, j) & d_y(i, j)^2 \end{bmatrix} = \begin{bmatrix} C_{xx} & C_{xy} \\ C_{xy} & C_{yy} \end{bmatrix} \quad \text{[Formula 21]}$$

The rotation angle θ (the direction of the gradient) is determined from the eigenvector of the covariance matrix (the structure tensor H) of the gradient. The major axis length $\lambda_+$ (the second eigenvalue) and the minor axis length $\lambda_-$ (the first eigenvalue) are the eigenvalues of the structure tensor (the covariance matrix of the gradient).

For example, the rotating kernel has an elliptical configuration in the case where the values of the pixels have a gradient (an edge) inside the image at the vicinity of the coordinates (i, j). The major axis of the ellipse is perpendicular to the direction of the gradient. The minor axis of the ellipse is parallel to the direction of the gradient.

FIG. 12A to FIG. 12F are schematic views illustrating rotating kernels according to the embodiment.

In FIG. 12A to FIG. 12F, images PIa to PIf of the vicinity of the coordinates (i, j) and the rotating kernel k(i, j, s) are illustrated to overlap in the drawings. The concentration of the dots in the drawings indicates the size of the values of the pixels inside the image. For example, regions having high concentrations of the dots are regions where the pixels have large values.

Figures 12A, 12B, 12C:
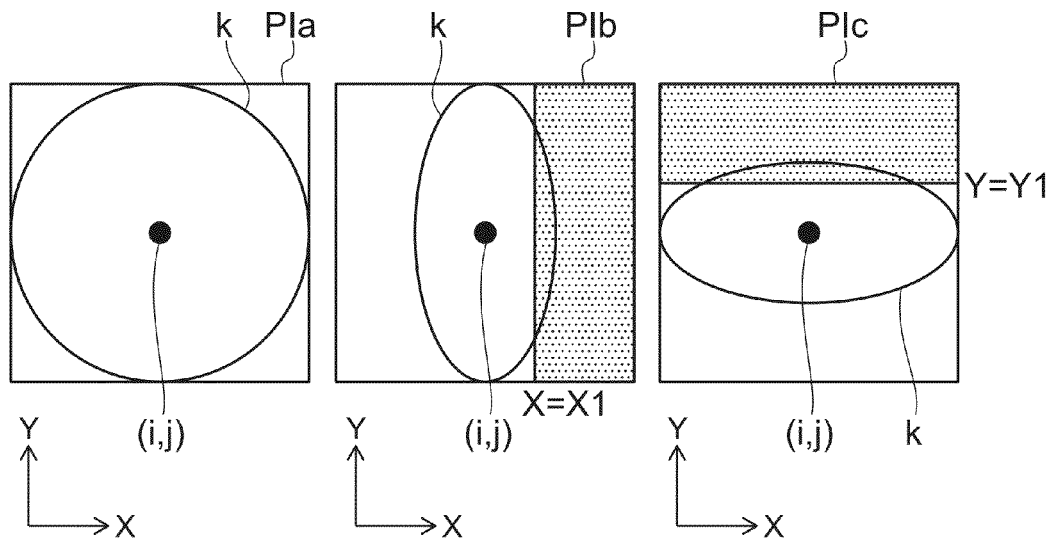
FIG. 12A to FIG. 12F are schematic views illustrating rotating kernels according to the embodiment.
Figures 12D, 12E, 12F:
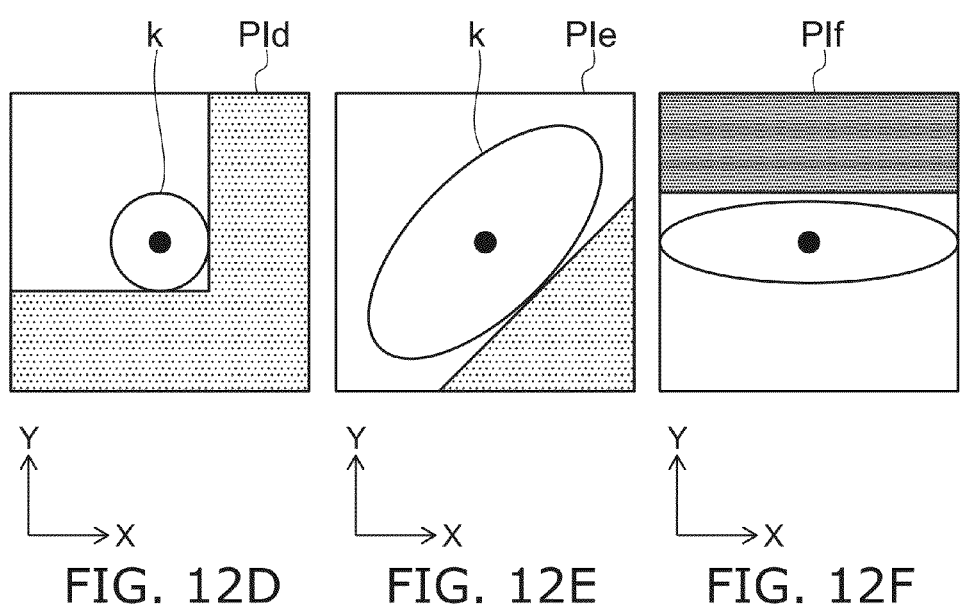

FIG. 12A shows the case where the values of the pixels at the periphery of the coordinates (i, j) do not have an edge. As shown in FIG. 12A, in such a case, the rotating kernel k(i, j, s) has a circular configuration.

FIG. 12B shows the case where there is an edge at the position at the periphery of the coordinates (i, j) where the x-coordinate is x1. In the example, the image has an edge that is parallel to the y-axis direction. In such a case, the rotating kernel k has an elliptical configuration. The major axis of the ellipse is parallel to the edge (perpendicular to the direction of the gradient). The minor axis of the ellipse is perpendicular to the edge (parallel to the direction of the gradient). The rotating kernel k is an ellipse that has a major axis parallel to the y-axis direction.

In FIG. 12C to FIG. 12F as well, the values of the pixels have edges at the periphery of the coordinates (i, j). Even in such cases, the major axis of the ellipse is parallel to the edge; and the minor axis of the ellipse is perpendicular to the edge. For example, the ratio $\lambda_+/\lambda_-$ of the major axis length $\lambda_+$ and the minor axis length $\lambda_-$ increases as the gradient of the pixels inside the image increases. In other words, the elliptical configuration of the rotating kernel k is mashed in the tangential direction of the edge as the edge inside the image becomes more distinct.

The structure tensor H of the rotating kernel k may be a structure tensor H that is convolved at a point inside the local vicinity N centered on the coordinates (i, j). Namely, $$H(i, j) = \frac{1}{\text{Num}(N)} \sum_{s \in N} \begin{bmatrix} d_x((i, j)^T + s)^2 & d_x((i, j)^T + s) d_y((i, j)^T + s) \\ d_x((i, j)^T + s) d_y((i, j)^T + s) & d_y((i, j)^T + s)^2 \end{bmatrix} \quad \text{[Formula 22]}$$

may be used. For example, the effects of the noise included in the input image are reduced; and the parameters of the rotating kernel k can be calculated stably.

The elongation ρ(i, j) is determined by the ratio of the eigenvalues (the ratio of a first eigenvalue to a second eigenvalue) of the covariance matrix of the gradient. For example, the elongation ρ(i, j) is expressed by $$\rho(i, j) = \frac{\lambda_- + \varepsilon_1}{\lambda_+ + \varepsilon_1}. \quad \text{[Formula 23]}$$

Here, $\varepsilon_1$ is a safety constant. For example, the safety constant $\varepsilon_1$ is greater than 0; and a safety constant $\varepsilon_1$ of 1 is used.

The scale γ(i, j) is determined by the product of the eigenvalues (the product of the first eigenvalue and the second eigenvalue) of the covariance matrix of the gradient. For example, the scale γ(i, j) is expressed by $$\gamma(i,j) = \sqrt{\lambda_- \lambda_+ + \varepsilon_2} \quad \text{[Formula 24]}.$$

Here, $\varepsilon_2$ is a safety constant. For example, the safety constant $\varepsilon_2$ is greater than 0; and a safety constant $\varepsilon_2$ of, for example, 0.01 is used.

For example, the edge feature quantity is the gradient of the values inside the image. The edge feature quantity includes, for example, the rotation angle θ, the elongation ρ, and the scale γ. For example, the edge feature quantity is used by being quantized. Namely, $$\theta_i(i, j) = \text{round}\left(\frac{\theta(i, j)}{\theta_0}\right) \quad \text{[Formula 25]}$$

$$\rho_i(i, j) = \text{round}\left(\frac{\rho}{\rho_0}\right)$$

$$\gamma_i(i, j) = \text{round}\left(\frac{\gamma}{\gamma_0}\right)$$

is used. Here, $\theta_0$, $\rho_0$, and $\gamma_0$ are quantized step sizes. "Round" means round to the nearest number. The feature of the image is classified into multiple classes using the edge feature quantity (the gradient) that is quantized.

In the embodiment, the filter coefficient f-hat$_{u,c}^{m,n,o}$ that is used in the demosaicing is determined (learning of the filter coefficient is performed) so that the following formulas are satisfied.

For example, the solutions of $$\hat{f}_{u,c}^{m,n,o} = \operatorname*{argmin}_{f} \sum_{\substack{(i,j)^T \in N_u | m=\theta_i(i,j), \\ n=\rho_i(i,j), o=\gamma_i(i,j)}} (y_{RAW}(i, j)^T f - x_c(i, j))^2, \quad \text{[Formula 26]}$$

$$\forall u \in U, c \in C$$

$$m = \theta_i(i, j), n = \rho_i(i, j), o = \gamma_i(i, j), \quad \text{[Formula 27]}$$

that is, the filter coefficient f-hat$_{u,c}^{m,n,o}$ for the demosaicing, is determined by $$\hat{f}_{u,c}^{m,n,o} = \left\{ \sum_{\substack{(i,j)^T \in N_u | m=\theta_i(i,j), \\ n=\rho_i(i,j), o=\gamma_i(i,j)}} (y_{RAW}(i,j)^T) \right\}^{-1} \quad \text{[Formula 28]}$$

$$\sum_{\substack{(i,j)^T \in N_u | m=\theta_i(i,j), \\ n=\rho_i(i,j), o=\gamma_i(i,j)}} y_{RAW}(i,j) x_c(i,j).$$

$$\forall u \in U, c \in C$$

In the embodiment, the filter coefficient f-hat$_{u,c}^{m,n,o}$ for the demosaicing is determined for each position u inside the unit pattern, for each color c corresponding to the values to be interpolated, and for each class (the feature of the image and the edge feature quantity).

For example, a filter coefficient that corresponds to the unit pattern of the color array of the color filters used in the image imaging element 70 is prepared. A pre-learned filter coefficient f-hat$_{u,c}^{m,n,o}$ for the demosaicing and the filter coefficients f-hat$_{u,dx}$ and f-hat$_{u,dy}$ for the gradient calculation are stored in the filter storage unit 40.

For example, there is a method of a reference example in which operations such as $$d_x = \begin{bmatrix} 0 & 0 & 0 \\ -1 & 0 & 1 \\ 0 & 0 & 0 \end{bmatrix} x \quad \text{[Formula 29]}$$

$$d_y = \begin{bmatrix} 0 & -1 & 0 \\ 0 & 0 & 0 \\ 0 & 1 & 0 \end{bmatrix} x,$$

$$d_x = \begin{bmatrix} -1 & 0 & 1 \\ -2 & 0 & 2 \\ -1 & 0 & 1 \end{bmatrix} x \quad \text{[Formula 30]}$$

$$d_y = \begin{bmatrix} -1 & -2 & -1 \\ 0 & 0 & 0 \\ 1 & 2 & 1 \end{bmatrix} x, \text{ and}$$

$$d = \begin{bmatrix} 0 & 1 & 0 \\ 1 & -4 & 1 \\ 0 & 1 & 0 \end{bmatrix} \quad \text{[Formula 31]}$$

are performed as the method for calculating the gradient of the values inside the image. All of these operations are defined as linear filters. However, the image for which such operations are performed is an image in which, for example, the channel (the color to which the values of the pixels correspond) is the same for all of the pixels included in the image. Such operations cannot be applied to a raw image that is imaged by a single-plate image sensor.

On the other hand, in the embodiment, the gradient is calculated by using the filter coefficient f-hat$_{u,dx}$ for the gradient calculation. The filter coefficient f-hat$_{u,dx}$ for the gradient calculation can be determined appropriately by learning. Thereby, the gradient of the values inside the image can be calculated even for the raw image that is imaged by the single-plate image sensor.

Figure 13:
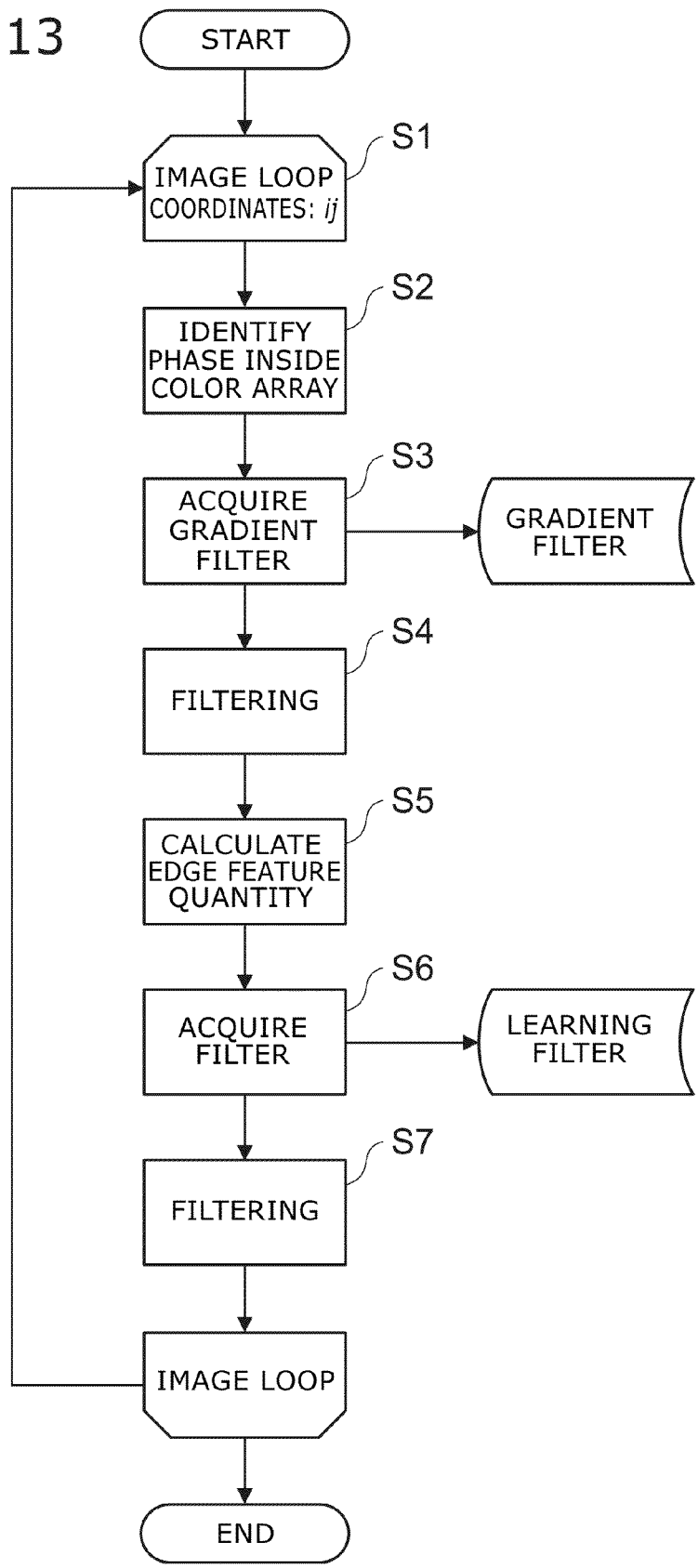
FIG. 13 is a schematic view illustrating the image processing method according to the embodiment.

FIG. 13 is a schematic view illustrating the image processing method according to the embodiment.

FIG. 13 shows a method for obtaining a full color image from a raw image. As shown in FIG. 13, the image processing method according to the embodiment includes an image acquisition step S1, a color array identification step S2, a gradient filter acquisition step S3, a gradient filter processing step S4, an edge feature quantity calculation step S5, a filter acquisition step S6, and a filter processing step S7.

In step S1, for example, the raw image that is stored in the input image storage unit 10 is acquired. The raw image (the input image) is an input image in which multiple pixels are arranged by repeating the unit pattern of the color array. Each of the multiple pixels has a value corresponding to one color included in the unit pattern of the color array.

Step S2 is processed by, for example, the color array identification step 20. For example, the position u inside the unit pattern of the color array of the pixel positioned at the coordinates (i, j) inside the image is identified.

For example, multiple filter coefficients for the gradient calculation are stored in the filter storage unit 40. The filter coefficients for the gradient calculation are determined by pre-learning for each position inside the unit pattern of the color array. In step S3, based on the position u that is identified, a filter coefficient (a second filter coefficient) for the gradient calculation is selected from the multiple filter coefficients for the gradient calculation stored in the filter storage unit 40.

In step S4, filter processing of the raw image data is performed using the filter coefficient for the gradient calculation that is selected. Thereby, the gradient of the values inside the image of the raw image is calculated.

In step S5, the edge feature quantity is calculated from the gradient that is calculated. Steps S3 to S5 are processed by the feature quantity calculator 30. For example, steps S3 to S5 are processed respectively by the filter coefficient acquisition unit 31, the filter arithmetic unit 32, and the edge feature quantity calculator 34.

The multiple filter coefficients for the demosaicing that are predetermined by learning for each edge feature quantity and for each position u are stored in the filter storage unit 40. The filter coefficient for the demosaicing supplements the values corresponding to one of the colors included in the unit pattern. In step S6, based on the edge feature quantity and the position u that are calculated in step S5, a filter coefficient (a first filter coefficient) for the demosaicing is selected from the multiple filter coefficients pre-stored in the filter storage unit 40. Step S6 is processed by, for example, the filter coefficient acquisition unit 51.

Step S7 is processed by, for example, the filter arithmetic unit 52 (the filter processor 50). Filter processing of the raw image data is performed using the filter coefficient f-hat$_{u,c}^{m,n,o}$ for the demosaicing that is selected. For example, the operation of $$x_R(i,j) = y_{RAW}(i,j)^T \hat{f}_{u,R}^{\theta_i(i,j), \rho_i(i,j), \gamma_i(i,j)}$$

$$x_G(i,j) = y_{RAW}(i,j)^T \hat{f}_{u,G}^{\theta_i(i,j), \rho_i(i,j), \gamma_i(i,j)}$$

$$x_B(i,j) = y_{RAW}(i,j)^T \hat{f}_{u,B}^{\theta_i(i,j), \rho_i(i,j), \gamma_i(i,j)} \quad \text{[Formula 32]}$$

is performed. Thereby, the value that corresponds to the color c included in the unit pattern of the color array is interpolated for the pixel at the coordinates (i, j).

For example, the processing of step S1 to step S7 is performed (image loop) for all of the pixels inside the raw image data. Thereby, a full color image can be obtained in which demosaicing of all of the pixels is performed.

The calculator 90 acquires the image information of the input image. The image information includes the value of the first pixel and values of each of the multiple peripheral pixels. The first pixel is disposed at the first position that has the first color. The multiple peripheral pixels are disposed around the first pixel.

For example, the first feature quantity (e.g., the edge feature quantity) is calculated by the feature quantity calculator 30 of the calculator 90. The first feature quantity relates to the difference (e.g., the gradient) between the value of the first pixel and the values of the peripheral pixels. The first feature quantity is calculated based on the value of the first pixel and the value of at least one of the multiple peripheral pixels.

For example, the peripheral pixels include a same-color pixel having the first color. For example, the first feature quantity is calculated based on the value of the same-color pixel. For example, the first feature quantity is calculated using the filter coefficient (the second filter coefficient), the value of the first pixel, and the value of at least one of the multiple peripheral pixels. The second filter coefficient is determined according to the first position.

The calculator 90 calculates a value relating to the second color at the first position by using the filter coefficient (the first filter coefficient) and the value of the second pixel. The first filter coefficient is determined according to the first position and the first feature quantity. The second pixel is a pixel of the multiple peripheral pixels that is disposed at a second position and has a second color different from the first color. The output unit 91 outputs the value relating to the second color at the first position that is calculated.

The image information includes, for example, values of each of the multiple peripheral pixels disposed around the second pixel.

The calculator 90 calculates the second feature quantity (e.g., the edge feature quantity) based on the value of the second pixel and the value of at least one of the multiple peripheral pixels disposed around the second pixel. The second feature quantity relates to the difference (e.g., the gradient) between the value of the second pixel and values of each of the multiple peripheral pixels disposed around the second pixel. The calculator 90 calculates a value relating to the first color at the second position by using the second feature quantity and the filter coefficient (the third filter coefficient). The third filter coefficient is determined according to the second position and the second feature quantity.

For example, the image quality of the full color image that is output is increased by appropriately determining the filter coefficient used in the demosaicing. In the image processing method according to the embodiment, the filter coefficient is determined for each position u inside the unit pattern, for each color c to which the values to be interpolated correspond, and for each class (edge feature quantity). Thereby, for example, the image quality of the full color image that is output increases.

For example, there are cases where the filter coefficient f-hat$_{u,c}$ of the reference example is used in the demosaicing. The filter coefficient f-hat$_{u,c}$ of the reference example is determined for each position u inside the unit pattern of the color array and for each color c to which the values to be interpolated correspond. The filter coefficient f-hat$_{u,c}$ of the reference example is not determined for each edge feature quantity.

For example, in the case where the filter coefficient f-hat$_{u,c}$ of the reference example is used, the interpolation of the values at the portions (the edges) where the gradient of the values inside the raw image is large may not be performed appropriately.

Figure 14:
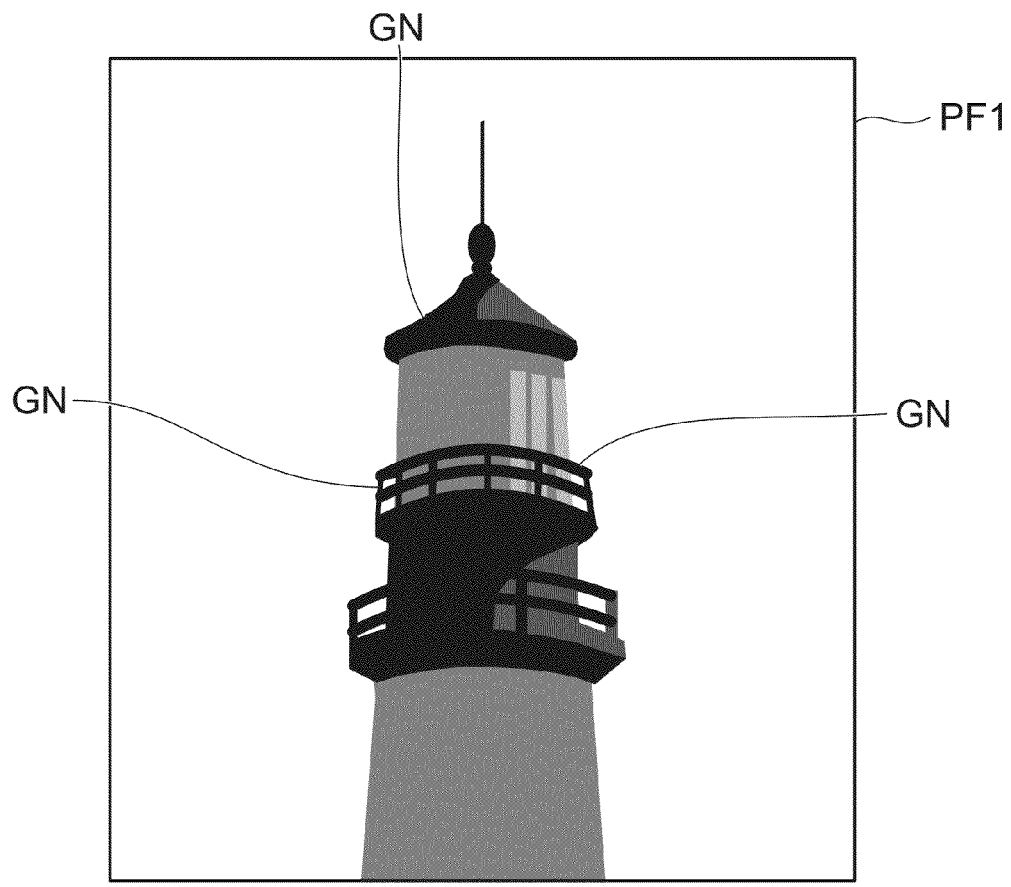
FIG. 14 is a schematic view illustrating an image of a reference example.

FIG. 14 is a schematic view illustrating an image of a reference example.

FIG. 14 shows a full color image PF1 obtained using the filter coefficient of the reference example. In such a case, for example, colors (false colors) that are different from the appropriate colors are output in the full color image PF1 after performing the demosaicing. For example, there are cases where noise GN (zipper noise) having a lattice configuration occurs in regions of the raw image having edges.

Figure 15:
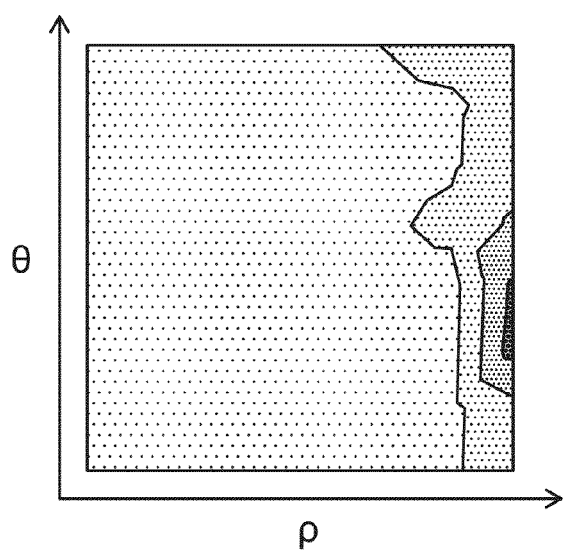
FIG. 15 is a schematic view illustrating the image processing method of the reference example.

FIG. 15 is a schematic view illustrating the image processing method of the reference example.

FIG. 15 shows the noise that occurs in the image shown in FIG. 14. FIG. 15 shows the difference between the image shown in FIG. 14 and an image (a correct image) in which the zipper noise does not occur. The horizontal axis of FIG. 15 is the size (the elongation ρ) of the gradient of the values of the raw image. The vertical axis of FIG. 15 is the direction (the rotation angle θ) of the gradient of the values of the raw image. In FIG. 15, the difference between the correct image and the full color image PF1 of FIG. 14 increases as the concentration of the dots increases. As shown in FIG. 15, it can be seen that the zipper noise occurs easily in the regions where the elongation ρ is large.

Conversely, the filter coefficient f-hat$_{u,c}^{m,n,o}$ for the demosaicing that is used in the embodiment is determined for each edge feature quantity. Even in the regions where the gradient of the values inside the raw image is large, the demosaicing can be performed using the appropriate filter coefficient; and a full color image that has low noise can be obtained.

In image sensors of recent years, there are cases where a color array including a white filter such as those shown in FIG. 6A and FIG. 6B is used due to the downscaling of the image sensor. The light transmissivity of the white filter is, for example, higher than those of red, green, and blue filters. Thereby, for example, high sensitivity can be obtained even in the case where the surface area of the photodiodes of the image sensor is small.

On the other hand, in the case where the white filter is provided, differences occur easily between the size of the values of the pixels corresponding to the white filter and the size of the values of the pixels corresponding to the filters of the other colors (e.g., the red, blue, and green filters). Thereby, for example, the zipper noise may occur easily in the full color image after performing the demosaicing.

Conversely, in the embodiment, the filter coefficient f-hat$_{u,c}^{m,n,o}$ for the demosaicing is determined for each edge feature quantity. Thereby, even in the regions where the gradient of the values inside the raw image is large, the demosaicing can be performed using the appropriate filter coefficient; and a full color image that has low noise can be obtained.

In the embodiment, learning is used as the method for determining the filter coefficient f-hat$_{u,c}^{m,n,o}$. Thereby, the appropriate filter coefficient f-hat$_{u,c}^{m,n,o}$ can be determined, for example, not only in the case where the color array (the Bayer array) shown in FIG. 4 is used, but also in the case where the color arrays shown in FIG. 6A and FIG. 6B and other color arrays are used.

In the embodiment, the filter coefficient f-hat$_{u,c}^{m,n,o}$ that is used in the demosaicing is determined by learning for each position of the unit pattern of the color array, for each color corresponding to the value to be interpolated, and for each feature of the image. An image that has low noise and higher image quality can be obtained.

Figure 16:
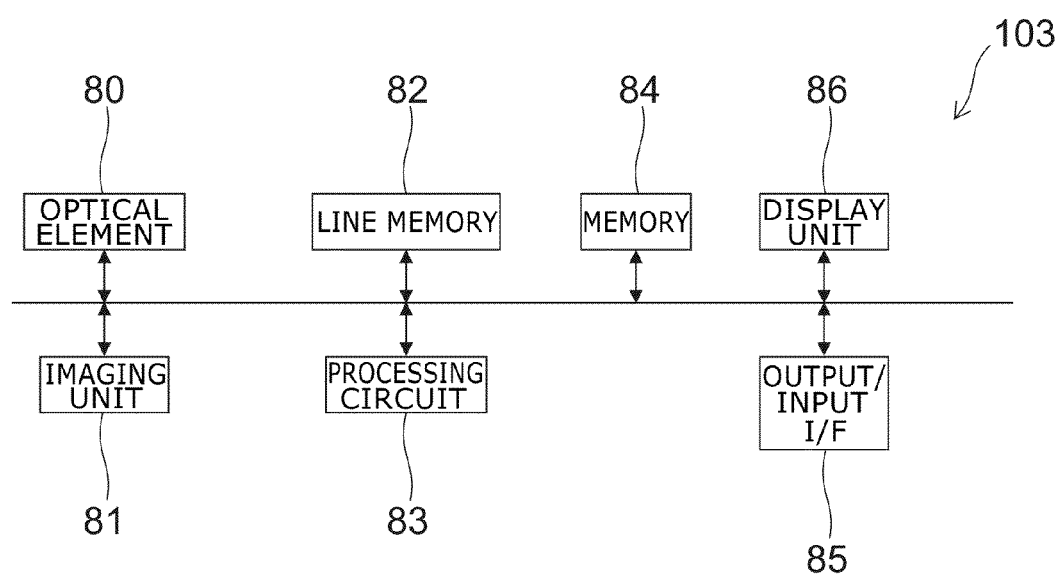
FIG. 16 is a schematic view showing an imaging device according to the embodiment.

FIG. 16 is a schematic view illustrating an imaging device according to the embodiment.

As shown in FIG. 16, the imaging device 103 includes an optical element 80, an imaging unit 81, a line memory 82, a processing circuit 83, a memory 84, an output/input I/F (interface) 85, and a display unit 86.

For example, the lens 72, the filter unit 74, etc., described in regard to FIG. 2 are provided in the optical element 80. A portion of the light from the subject travels through the optical element 80 toward the imaging device 103 and is incident on the imaging unit 81.

The imaging unit 81 includes, for example, a CMOS image sensor, a CCD image sensor, etc. The values that correspond to the light that is incident on the imaging unit 81 are detected. The values that are detected by the imaging unit 81 are stored in the line memory 82. For example, the line memory 82 corresponds to the input image storage unit 10.

For example, the memory 84 stores multiple filter coefficients. For example, a program for processing the values is stored in the processing circuit 83. The processing circuit 83 processes the values stored in the line memory 82 by referring to the filter coefficients. For example, the processing circuit 83 corresponds to the feature quantity calculator 30 and the filter processor 50. For example, the memory 84 corresponds to the filter storage unit 40.

For example, the output/input I/F 85 transmits the values processed by the processing circuit 83 to the display unit 86. For example, the output/input I/F 85 corresponds to the output unit 91. The image is displayed by the display unit 86.

For example, each of the processing circuit 83, the line memory 82, and the memory 84 may be provided on the same substrate as a single body. At least a portion of these components may be provided in another substrate. The line memory 82 and the memory 84 may be a memory device formed as a single body or may be memory devices that are formed separately.

For example, the program that is stored in the processing circuit 83 and the filter coefficients that are stored in the memory 84 are provided in a pre-stored state. The program that is stored in the processing circuit 83 and the filter coefficients that are stored in the memory 84 may be provided as a storage medium such as CD-ROM, etc., or via a network, and may be installed as appropriate.

According to the embodiment of the invention, an image processing device, an image processing method, and an imaging device that generate a high quality image are provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components such as the input image storage unit, the color array identification step, the feature quantity calculator, the filter storage unit, the filter processor, the imaging element, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all image processing devices, image processing methods, and imaging devices practicable by an appropriate design modification by one skilled in the art based on the image processing devices, the imaging processing methods, and the imaging devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image processing device, comprising:
processing circuitry configured to implement a calculator; and
an output interface,
wherein the calculator acquires first image information including a value of a first pixel and values of each of a plurality of peripheral pixels disposed around the first pixel, the first pixel being disposed at a first position and having a first color, at least one of the peripheral pixels including a second pixel having a second color, the second color being different from the first color,
the calculator calculates, based on the value of the first pixel and a value of at least one of the peripheral pixels, a first feature quantity of the value of the first pixel relating to a difference between the value of the first pixel and the values of each of the peripheral pixels,
the calculator calculates a value relating to the second color at the first position by using a first filter coefficient and a value of the second pixel, the first filter coefficient being determined according to the first feature quantity and the first position, and
the output interface outputs second image information based on the calculated value relating to the second color at the first position.

2. The device according to claim 1, wherein
the peripheral pixels include a same-color pixel having the first color, and
the first feature quantity is calculated based on a value of the same-color pixel.

3. The device according to claim 1, wherein the first feature quantity is calculated using a second filter coefficient, the value of the first pixel, and the value of at least one of the plurality of peripheral pixels, the second filter coefficient being determined according to the first position.

4. The device according to claim 1, wherein the first feature quantity is determined using at least an eigenvector and a ratio, the eigenvector being an eigenvector of a covariance matrix relating to the difference, the ratio being a ratio of a first eigenvalue of the covariance matrix to a second eigenvalue of the covariance matrix.

5. The device according to claim 1, wherein
the first image information further includes a value of a third pixel having a third color different from the first color and the second color, and
each of the first color, the second color, and the third color is one color of red, green, or blue.

6. The device according to claim 5, wherein
the first color is a first green color,
the second color is a first blue color,
the third color is a first red color,
the first image information further includes a value of a fourth pixel having a second green color, the first pixel is arranged with the second pixel in a first direction, the third pixel is arranged with the first pixel in a second direction intersecting the first direction, and the fourth pixel is arranged with the second pixel in the second direction and arranged with the third pixel in the first direction.

7. The device according to claim 1, wherein the first image information further includes a value of a third pixel and a value of a fourth pixel, the third pixel having a third color different from the first color and the second color, the fourth pixel having a fourth color different from the first color, the second color, and the third color, and each of the first color, the second color, the third color, and the fourth color is one color of red, green, blue, or white.

8. The device according to claim 7, wherein the first color is a first green color, the second color is a first blue color, the third color is a first red color, the fourth color is a first white color, the first pixel is arranged with the second pixel in a first direction, the third pixel is arranged with the first pixel in a second direction intersecting the first direction, and the fourth pixel is arranged with the second pixel in the second direction and arranged with the third pixel in the first direction.

9. The device according to claim 1, wherein the second pixel is disposed at a second position, the first image information further includes values of each of a plurality of pixels disposed around the second pixel, the calculator calculates, based on the value of the second pixel and a value of at least one of the pixels disposed around the second pixel, a second feature quantity of the value of the second pixel relating to a difference between the value of the second pixel and the values of each of the pixels disposed around the second pixel, and the calculator calculates a value relating to the first color at the second position by using a third filter coefficient and the value of the first pixel, the third filter coefficient being determined according to the second feature quantity and the second position.

10. An imaging device, comprising:

the image processing device according to claim 1; and an image detector configured to image an image including the first image information.

11. The imaging device according to claim 10, wherein the image detector comprises a CMOS image sensor.

12. The imaging device according to claim 10, wherein the image detector comprises a CCD image sensor.

13. An image processing method, comprising:

acquiring first image information including a value of a first pixel and values of each of a plurality of peripheral pixels disposed around the first pixel, the first pixel having a first color and being disposed at a first position, at least one of the peripheral pixels including a second pixel having a second color, the second color being different from the first color;

calculating, by processing circuitry, based on the value of the first pixel and a value of at least one of the peripheral pixels, a first feature quantity of the value of the first pixel relating to a difference between the value of the first pixel and the values of each of the peripheral pixels;

calculating, by the processing circuitry, a value relating to the second color at the first position by using a first filter coefficient and a value of the second pixel, the first filter coefficient being determined according to the first feature quantity and the first position; and outputting second image information based on the calculated value relating to the second color at the first position.

14. The method according to claim 13, wherein the peripheral pixels includes a same-color pixel having the first color, and the calculating of the first feature quantity includes calculating the first feature quantity based on a value of the same-color pixel.

15. The method according to claim 13, wherein the calculating of the first feature quantity includes calculating the first feature quantity using a second filter coefficient, the value of the first pixel, and the value of at least one of the plurality of peripheral pixels, the second filter coefficient being determined according to the first position.

16. The method according to claim 13, wherein the calculating of the first feature quantity includes determining the first feature quantity using at least a direction and a ratio, the direction being a direction of the gradient determined from an eigenvector of a covariance matrix of the gradient, the ratio being a ratio of eigenvalues of the covariance matrix.

17. The method according to claim 13, wherein the first image information further includes a value of a third pixel having a third color different from the first color and the second color, and each of the first color, the second color, and the third color is one color of red, green, or blue.

18. The method according to claim 17, wherein the first color is a first green color, the second color is a first blue color, the third color is a first red color, the first image information further includes a value of a fourth pixel having a second green color, the first pixel is arranged with the second pixel in a first direction, the third pixel is arranged with the first pixel in a second direction intersecting the first direction, and the fourth pixel is arranged with the second pixel in the second direction and arranged with the third pixel in the first direction.

19. The method according to claim 18, wherein the first image information further includes a value of a third pixel and a value of a fourth pixel, the third pixel having a third color different from the first color and the second color, the fourth pixel having a fourth color different from the first color, the second color, and the third color, and each of the first color, the second color, the third color, and the fourth color is one color of red, green, blue, or white.

20. The method according to claim 19, wherein the first color is a first green color, the second color is a first blue color, the third color is a first red color, the fourth color is a first white color, the first pixel is arranged with the second pixel in a first direction, the third pixel is arranged with the first pixel in a second direction intersecting the first direction, and the fourth pixel is arranged with the second pixel in the second direction and arranged with the third pixel in the first direction.

* * * * *